United States Patent [19]

Blaire

[11] 4,080,682
[45] Mar. 28, 1978

[54] MEAT CLEANING MACHINE
[76] Inventor: Pete Blaire, 175 McKinley Ave., Mercer, Pa. 16137
[21] Appl. No.: 764,273
[22] Filed: Jan. 31, 1977
[51] Int. Cl.² ............................................. A22B 17/08
[52] U.S. Cl. .......................................... 15/3.1; 15/77
[58] Field of Search .................. 15/3.1, 3.13, 3.16, 15/3.17, 3.18, 40, 21 E, 77, 93 R, 102, 93, 97; 51/34 R, 34 C, 34 D, 34 E, 34 F, 34 G

[56] References Cited

U.S. PATENT DOCUMENTS

| 1,921,675 | 8/1933 | Howell | 15/21 E X |
| 2,096,915 | 10/1937 | Polgar | 15/21 E |
| 2,694,274 | 11/1954 | McGibbon | 15/102 X |
| 2,817,862 | 12/1957 | Frazho et al. | 15/3.17 |
| 3,478,380 | 11/1969 | Russell | 15/3.17 |
| 3,802,421 | 4/1974 | Williams | 15/21 E X |

*Primary Examiner*—Edward L. Roberts
*Attorney, Agent, or Firm*—Webster B. Harpman

[57] ABSTRACT

A meat cleaning machine positions and holds a cut of meat to be cleaned on an elongated support and provides a carriage incorporating holding and scraping rolls for movement relative to the cut of meat to be cleaned. A power source is provided on the carriage for moving the same along the support and simultaneously rotating the scraping roll.

2 Claims, 4 Drawing Figures

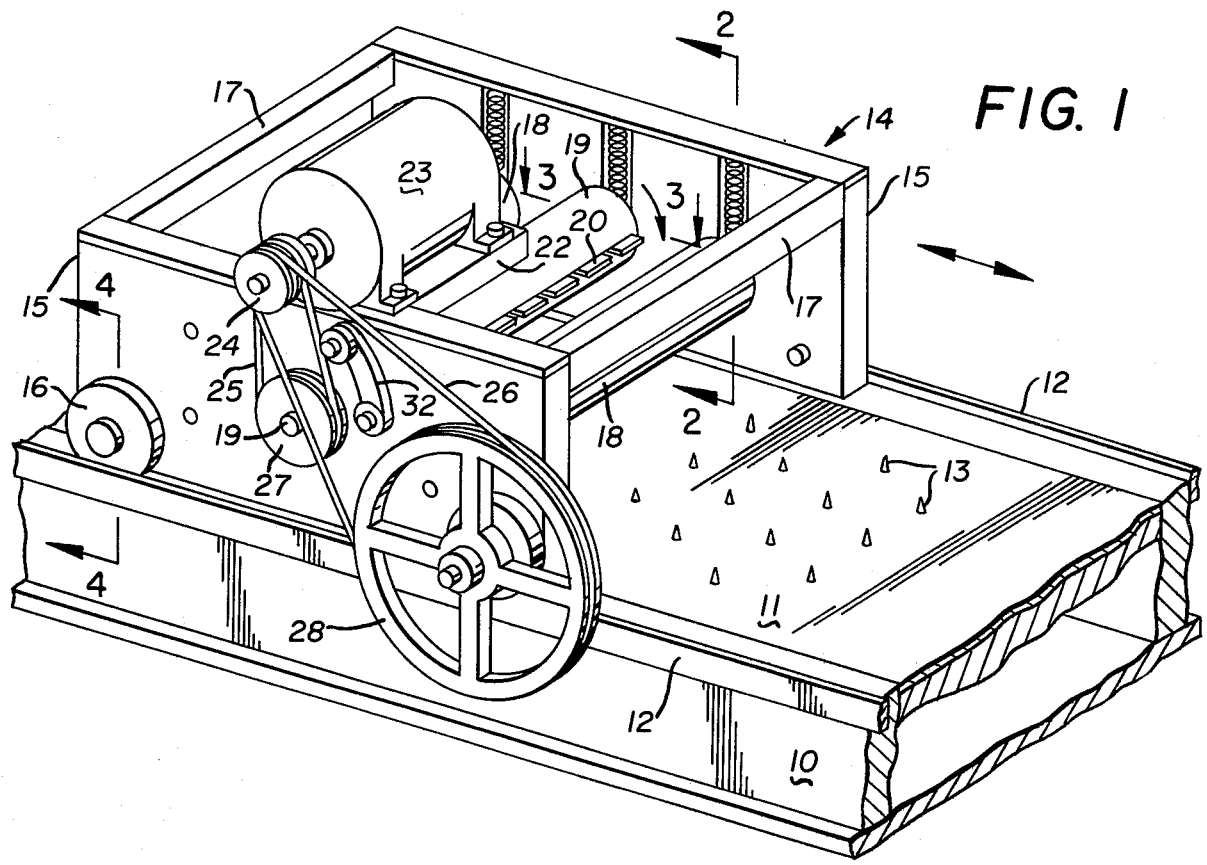
FIG. 1
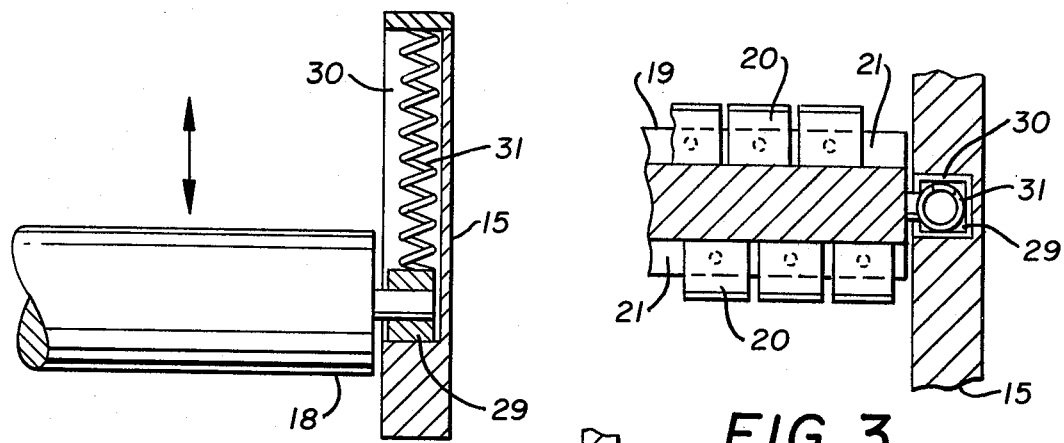
FIG. 2
FIG. 3
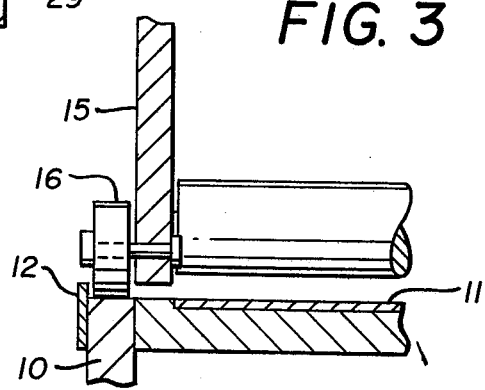
FIG. 4

MEAT CLEANING MACHINE

BACKGROUND OF THE INVENTION

1. Field of the Invention

This invention relates to meat cleaning machines as employed to remove refuse particles from freshly cut meat.

2. Description of the Prior Art

Prior machines of this type have generally employed rotating brushes against which the cut of meat to be cleaned may be engaged. (See U.S. Pat. Nos. 2,959,797, 3,061,856, 3,076,997, 3,231,915 and 3,261,046.)

This invention eliminates the brushes heretofore believed essential in cleaning fresh cut meat and provides a machine which quickly and easily cleans the meat and is itself easily cleanable as compared with the prior art brushes.

DESCRIPTON OF THE DRAWINGS

FIG. 1 is a perspective elevation of the meat cleaning machine with parts broken away and parts in cross section;

FIG. 2 is an enlarged cross sectional detail on line 2—2 of FIG. 1;

FIG. 3 is an enlarged cross sectional detail on line 3—3 of FIG. 1; and

FIG. 4 is an enlarged cross sectional detail on line 4—4 of FIG. 1.

DESCRIPTION OF THE PREFERRED EMBODIMENT

In the form of the invention chosen for illustration and description herein, the meat cleaning machine comprises a base 10 having a readily cleansible upper surface sheet 11 and a pair of longitudinally extending guide rails 12 along its opposite sides. Sharpened points 13 are positioned in staggered relation on the upper surface of the sheet 11 so that a piece of fresh cut meat positioned thereon will be retained thereby. A carriage, generally indicated at 14, includes oppositely disposed sides 15, each having rollers 16 adjacent its lower edge, the rollers 16 being engaged on the upper longitudinal edges of the base 10 and guided by the guide rails 12. The carriage is therefore movable longitudinally of the base 10 and the sheet 11 and a piece of freshly cut meat positioned thereon.

The carriage includes cross frame members 17 and the oppositely disposed sides 15 of the carriage journal a plurality of rolls two of which, indicated by the numerals 18, serve to hold a piece of fresh cut meat in position on the sheet 11 and a third roll 19 is positioned intermediate the rolls 18 and has a plurality of blades 20 preferably arranged in two oppositely disposed rows, see FIG. 3 of the drawings. The blades 20 are preferably arranged in the oppositely disposed rows by being located in longitudinally extending slots 21 in the roll 19 and secured therein by a suitable fastening means which may include set screws or the like. Alternately the blades 20 may be cemented in the slots 21 in the roll 19. In either event their outermost sharpened edges form straight lines and as the blades 20 are staggered in the slots 21, rotation of the roll 19 will revolve the rows of blades 20 against the surface of the piece of fresh cut meat to be cleaned as the roll 19 and the carriage 14 move over the same. In order that the roll 1 may be revolved, the carriage 14 is provided with a mounting bracket 22 and an electric motor 23 is positioned thereon and its drive shaft is provided with a multiple pulley 24. Belts 25 and 26 extend from the multiple pulley 24 to secondary pulleys 27 and 28 respectively. The secondary pulley 27 is secured to one of the necks of the roll 19 so that the same may be revolved thereby. The secondary pulley 28 which is relatively larger than the other pulleys is secured to one of the rollers 16 and serves to move the carriage 14 relative to the base 10 and the piece of meat to be cleaned on the sheet 11 thereof. Switches not shown are provided to control the motor 23 with respect to a power source and these may include reverse switches mounted on the ends of the base 10 so that the carriage will reciprocate in its movement relative thereto.

The rolls 18 and 19 are arranged in the carriage 14, both for rotary motion and vertical motion and by referring to FIGS. 2 and 3 of the drawings it will be seen that the necks on the ends of the rolls 18 and 19 are journaled in bearing blocks 29 which are vertically movable in channels 30 formed in oppositely disposed relation in the inner surfaces of the sides 15 of the carriage 14. The channels 30 extend vertically and the bearing blocks are normally urged downwardly therein by coil springs 31 which are also positioned in the channels 30 and above the bearing blocks 29.

Referring again to FIG. 1 of the drawings, it will be seen that a spring urged tensioning device 32 is engaged against the belt 25 so as to maintain the necessary tension to insure the cleaning and scraping action of the blades 20 as they engage the piece of fresh cut meat to be cleaned.

It will thus be seen that a meat cleaning machine has been disclosed which is relatively simple in construction and operation and which will adjust its cleaning means, the roll 19 and the rows of blades 20 vertically to compensate for various thicknesses of freshly cut meat positioned on the sheet 11 and that the reciprocal action of the carriage 14 with respect to the piece of meat will quickly and easily clean the same. It will be obvious to those skilled in the art that when the uppermost surface of the piece of freshly cut meat has been cleaned, it can be picked up and turned over so that is lower surface is similarly cleaned.

It has been determined that one pass of the carriage and its cleaning and holding rolls over the meat is sufficient to clean one surface thereof.

It will also be seen that the meat is held in appropriate position for action of the cleaning roll 19 and the blades 20 by the rolls 18, which like the cleaning roll 19, are journaled in baring blocks 29 and held in vertically arranged channels 30 by springs 31. Thus the holding and cleaning rolls move with respect to the piece of meat and the size thereof positioned on the device and insure the engagement of the blades 20 of the cleaning roll 19 in proper tensioned relation thereto at all times.

Although but one embodiment of the present invention has been illustrated and described, it will be apparent to those skilled in the art that various changes and modifications may be made therein with out departing from the spirit of the invention and having thus described my invention.

What I claim is:

1. A meat cleaning machine comprising in combination a base having a surface area for receiving meat to be cleaned and a carriage having cleaning means engagable with said meat arranged on said base for reciprocal movement relative thereto, said cleaning means including at least one roll arranged transversely of said carriage, vertically movable journals engaged on the ends of said roll, guide configurations on said carriage for receiving journals, means for rotating said roll, at least one blade arranged longitudinally of said roll so as to present an edge for engaging and scraping said meat when said roll is revolved, at least one secondary roll arranged transversely of said carriage in spaced relation to said first mentioned roll, secondary vertically movable journals engaged on the ends of said secondary roll, secondary guide configurations on said carriage for receiving said secondary journals and spring means normally urging said secondary journals and secondary roll toward said base, said secondary roll being arranged to engage and hold said meat in position on said surface area.

2. The meat cleaning machine set forth in claim 1 and wherein pointed members are positioned on said surface area of said base for holding said meat in fixed position thereon.

* * * * *